United States Patent [19]

Schultze

[11] 4,331,965

[45] May 25, 1982

[54] RECORDING DEVICE FOR A TACHOGRAPH WITH TIME MARKINGS

[75] Inventor: Hartmut Schultze, Villingen-Schwenningen, Fed. Rep. of Germany

[73] Assignee: Kienzle Apparate GmbH, Villingen, Fed. Rep. of Germany

[21] Appl. No.: 198,287

[22] Filed: Oct. 20, 1980

[30] Foreign Application Priority Data

Oct. 25, 1979 [DE] Fed. Rep. of Germany ....... 2943056

[51] Int. Cl.³ .......................................... G01D 15/16
[52] U.S. Cl. .............................. 346/121; 346/33 D; 346/62
[58] Field of Search ................. 346/18, 33 D, 121, 62

[56] References Cited

U.S. PATENT DOCUMENTS

| | | | |
|---|---|---|---|
| 3,012,838 | 12/1961 | Wagner et al. | 346/62 X |
| 3,132,916 | 5/1964 | Muller | 346/18 X |
| 3,141,726 | 7/1964 | Vogtlin | 346/121 X |
| 3,274,609 | 9/1966 | Boone | 346/62 |
| 4,179,701 | 12/1979 | Bartschi | 346/62 |

Primary Examiner—George H. Miller, Jr.
Attorney, Agent, or Firm—Toren, McGeady and Stanger

[57] ABSTRACT

A device for recording time markings on a speed graph in a tachograph includes a support mounting a pair of rods on which a slide is movably displaceable. The slide supports a recording member or stylus for marking the graph. An electromagnet is arranged to tilt the slide and laterally displace the stylus for a brief period of time in the direction of the time coordinate of the tachograph for effecting a marking on the speed graph.

4 Claims, 4 Drawing Figures

RECORDING DEVICE FOR A TACHOGRAPH WITH TIME MARKINGS

SUMMARY OF THE INVENTION

The invention is directed to a device for use in a tachograph for recording time markings superimposed on a speed chart by momentarily deflecting a recording member in the direction of the time coordinate of the graph. The recording member is deflected transversely of normal direction in which it is moved relative to the speed graph which is driven in synchronism with actually elapsed time.

As is well known, the recordings made in a tachograph serve, on one hand, for the operation of a motor vehicle fleet, that is, the evaluation of the utilization of the vehicles, the economical use of the vehicles and the manner in which the driver operates the vehicle and, on the other hand, for the separate detection of time periods of different types of activities performed during the operation of the motor vehicle by the driver or by a crew operating the vehicle.

Moreover, the speed graph or chart recorded by a tachograph should also supply information concerning the operation of the vehicle in the case of an accident. Accordingly, it is particularly desirable to effect as accurate a resolution of the speed graph with respect to time as is possible.

This last requirement is in contradiction to the objects previously mentioned inasmuch as the latter requirement concerns long-time recordings which can be recorded closely together but without any time gaps, since any periods when the vehicle is at a standstill are significant.

Therefore, for the first-mentioned requirements for a tachograph, it is quite appropriate to use a recording medium or chart having a relatively low recording capacity, for example, a chart or graph which operates at a rate of rotation of 1/1440/minutes as is generally common in present day tachographs. Such a recording medium offers an advantageous manipulation in addition to structural advantages, that is, with regard to space requirements and drive means, and permits at a glance a check of the occurrences during a trip.

With regard to the second-mentioned requirement, however, though expensive and powerful microscopes are employed, a time resolution of the speed graph is not possible below a two-second limit in an accident analysis or for the interpretation of significant acceleration and deceleration values. Such situations in the operation of a motor vehicle are difficult to judge satisfactorily.

To solve this problem, it would be possible to use so-called short distance recorders which are well known and in which the recording medium or chart is driven in dependence on the distance travelled and is continuously erasable so that only a record of the most recent travelled distance is afforded with a high time resolution being provided. Using such an arrangement, however, it is not possible to effect a time recording of any appreciable duration, unless such a short distance recorder is used in combination with a conventional tachograph.

There is a known tachograph in which the recording chart can be driven at an increased speed, if necessary, with the speed graph being expanded, if required. Such tachographs are useful for planned braking tests or acceleration tests, however, they are unsuitable for recording unpredictable occurrences, such as an accident.

In West German Pat. No. 1,195,978, by contrast, a device is disclosed which makes it possible to superimpose on the speed graph in a tachograph, additional information by momentarily lifting the stylus recording the speed graph from the graph supporting member or disc in a manner controlled in dependence on distance. In an accident situation, such a speed graph makes it possible to determine the stopping distance of the vehicle in a relatively simple manner. The determination of average acceleration values, however, with such a speed graph imposes significant problems with regard to measuring techniques. Aside from the production expenses and the deficiencies with regard to recording techniques which occur when the stylus is lifted from the recording graph and when it is placed back on the graph, there is the additional and decisive disadvantage of this device that in an accident or accident-like situation, the interruptions in the speed graph are relatively great and, therefore, there is the danger that essential information may not be recorded.

In German Auslegeschrift 1,281,197 an arrangement is shown for the superimposition of additional information on the speed graph in a tachograph. In this particular arrangement, the recording stylus is swung in the direction of the time coordinate during extremes of acceleration or deceleration. As a result, compared to the above-described recording device, the disadvantage of recording gaps is avoided, however, since the absolute values of accelerations or stopping distances cannot be determined with the aid of such a yes/no statement, significant criteria for evaluating trip sequences are suppressed.

Furthermore, in this arrangement, where one of the two guide rods on which the recording slide is movably supported, where it is arranged to be pivoted, a degree of the precision required for the recording slide is lost.

Therefore, it is the primary object of the present invention to improve the resolution of a speed graph in a tachograph by superimposing additional information in such a way that the analysis of acceleration procedures, especially in the evaluation of accidents, can be effected in a simple manner and with improved accuracy, while avoiding the above-described disadvantages of known recording devices which serve the same purpose.

In accordance with the present invention, the recording device includes, in a known manner, a slide movably supported on stationary guide rods so that it is positioned parallel to a recording support surface. A recording member or stylus is resiliently supported on the slide and extends essentially perpendicular to the surface of the recording graph. An electromagnet, excited by a pulse generator which generates time-constant pulses, is positioned so that it causes the slide to deflect with the result that the recording member is laterally displaced in the direction of the time coordinate of the recording graph by changing the direction of play in the tolerance between the slide and the guide rods. The biasing action displacing the recording member toward the recording graph cooperates in the desired displacement of the recording member.

In one embodiment of the present invention, the slide includes a ferromagnetic element attracted by the electromagnet so that the slide is tilted relative to the guide rods. In other words, a torque is applied to the slide with a change occurring in the bearing play between the slide and one of the guide rods.

In a special embodiment of the invention, the slide is formed of a ferromagnetic material.

Since additional information can be superimposed on the speed graph by pivoting the slide with minimum bearing play on its support members, as is required for highly accurate guidance, the invention offers the advantage of extremely low expenses for production and assembly. A particularly advantageous feature of the invention is that the design and arrangement of the speed recording means, which are decisive for the accuracy of the recordings, can be maintained in a conventional and proven manner. Accordingly, presently known tachographs can be easily converted or fitted to include the present invention. Because of the given play or tolerance of the slide on its supports, the deflection of the recording member or stylus from the speed recording track is extremely short, for instance, on the magnitude of 5 msec., with the information loss regarding speed being negligibly small. On the other hand, if a cycle of 1 pulse/sec is selected, an increase in the accuracy with respect to the evaluation of the speed graph of 100% can be achieved compared to the above-mentioned resolution limit. If this increase in accuracy is only partially required or is not required at all, greater finishing tolerances are acceptable in the manufacture of the drive mechanism which moves the graph support member, so that a lower reject rate can be achieved.

It is also conceivable, however, while maintaining the same accuracy of evaluation as before, to reduce the diameter of the speed graph support and thus reduce the outer contours of the tachograph, or to limit the recording field for the speed recording on the recording member so that space for additional recordings is created. Another advantage is that the time-proportional makings, recorded as additional information, are clearly visible only under microscopic inspection as is required in accident evaluations, and, therefore, do not appear as disturbances when the speed graph is viewed without the use of optical enlarging means. Finally, it should be mentioned that the invention facilitates a contact-free transmission of movement to the recording member and that the slide, in one case, is not loaded with any additional weight, and, otherwise, only with a very slight additional weight.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
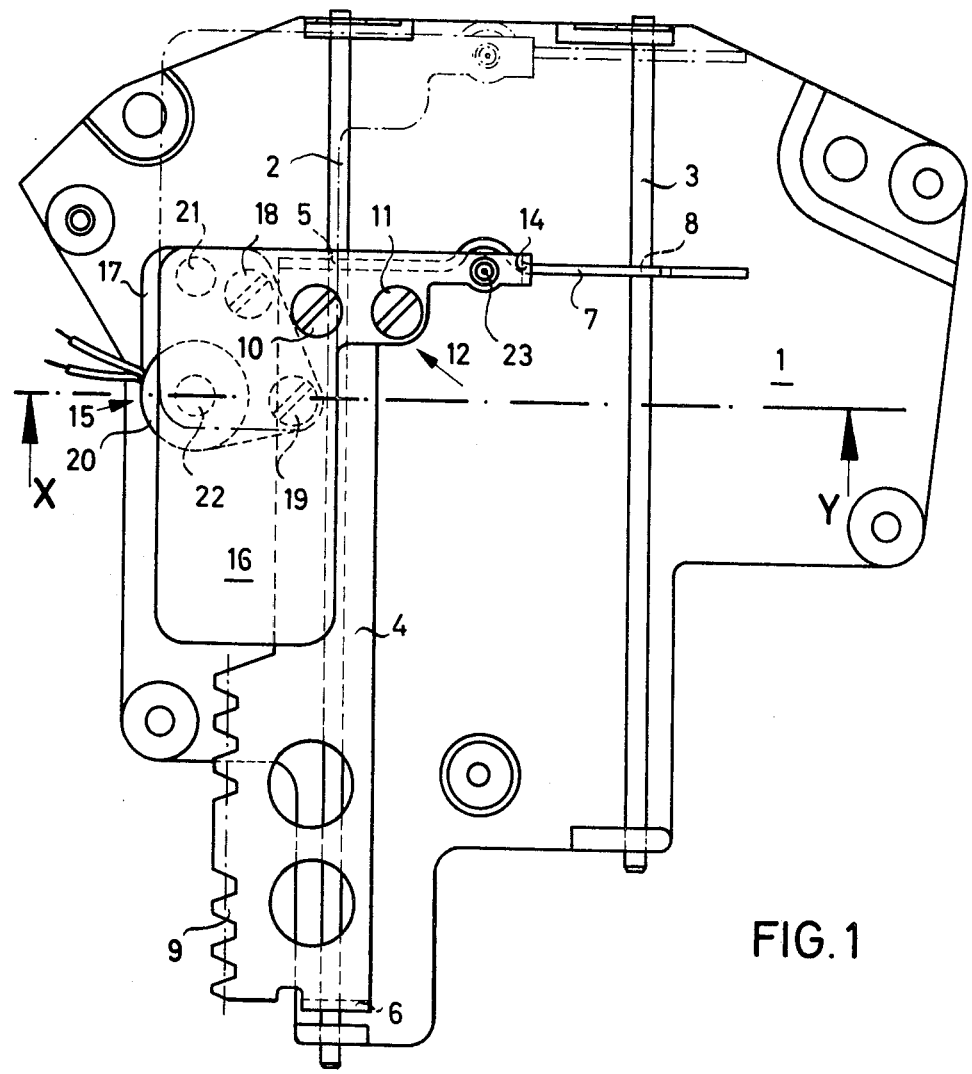
FIG. 1 is a plan view of a speed recording device for a tachograph embodying the present invention.
Figure 2:
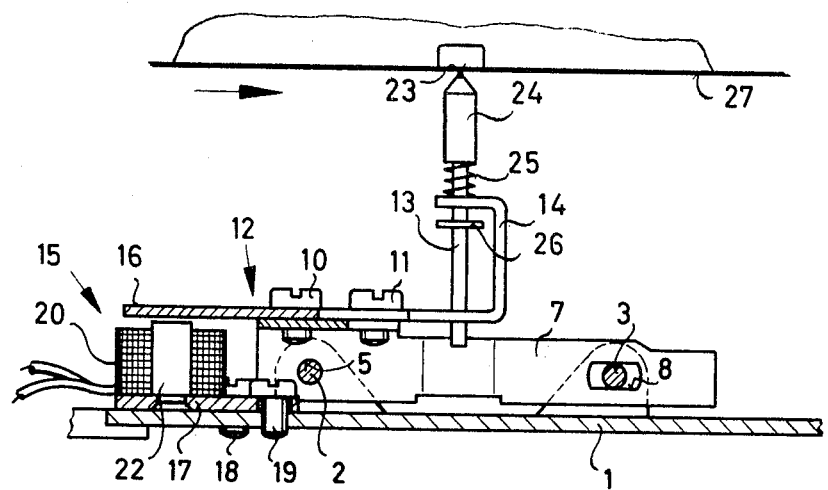
FIG. 2 is a sectional view taken along the line II—II in FIG. 1.

In FIG. 1 a frame 1 forms a carrier or support for a recording device adapted to be inserted into a tachograph. A pair of rods 2, 3 are fixed to the frame 1 and serve as bearing and guide elements for a slide 4. For the sake of clarity the remaining recording slides required in a tachograph have not been illustrated. Slide 4 constructed as a support has two bearings 5, 6 on guide rod 2 and another bearing 8 on guide rod 3. Bearing 8 is in the form of a slightly elongated slot in a web 7 forming a part of the slide 4. Further, as can be seen in FIG. 1, teeth 9 are formed along one side of the slide 4 for engagement with a movement for measuring the speed of the tachograph, such movement is not illustrated because it is not an essential part of the invention. As is shown in FIGS. 1 and 2, a holder 12 is fastened to the slide 4 by screws 10, 11. Holder 12 includes a bearing support 14 extending upwardly as shown in FIG. 2, and acting as a support for the recording member or stylus shaft 13. This arrangement is known per se. Holder 12 is formed of a magnetic material so that it forms an armature 16 for an electromagnet 15. The armature 16 is located a short distance above the pair of poles of the electromagnet 15. The electromagnet 15 is connected to the frame 1 by a short circuit plate 17 and screws 18, 19. Further, the electromagnet includes a coil 20 and pole pins 21, 22 fastened to the short-circuit plate 17. Electromagnet 15 can be constructed in a different manner, such as with the short-circuit plate and pole pins forming a single part. It is essential, however, that the poles of the electro-magnet 15 are covered by the armature 16 in every position of the slide 4.

For completeness, it should be noted that the recording tip 23 of the recording member is a sapphire tip rigidly connected to a recording stylus shaft 13 by means of a suitable mounting 24, note FIG. 2. A spring 25 encircling the shaft 13 extends between the mounting 24 and the bearing support 14 affording the necessary force for biasing the recording tip against a speed graph 27 mounted on a support surface. A locking disc 26 is fixed to the shaft 13 and limits the axial displacement of the recording member in the event the recording member does not contact the speed graph 27 in case the tachograph is opened or the graph is missing. The armature 16 is fastened to the slide as a separate piece, however, the slide could be formed of a ferromagnetic material with the armature 16 forming a part of the slide 4.

If current is supplied to the coil 20 of the electromagnet 15 from a time-constant pulse generator which is known and therefore has not been illustrated, the armature is attracted and the slide is pivoted about guide rod 2 due to the bearing play existing in the bearing 8 mounted on the guide rod 3. In other words, there is a change in direction of the force acting on the recording tip 23 in opposition to the action of the spring 25. Accordingly, the recording tip is deflected from the speed recording track, preferably because of the bearing tolerance involved and the full deflecting stroke is transmitted to the recording tip 23 transversely of the direction in which the speed graph 27 is moved and this requires an appropriate arrangement of the electromagnet 15. After the termination of the pulse, the magnetic contraction is discontinued and the pulse is on the order of magnitude of 5 msec and, for example, takes place with a cycle of 1/sec, accordingly the slide is returned to its initial position by the spring 25 so that the spring provides both the recording force and the restoring force.

Figure 3:
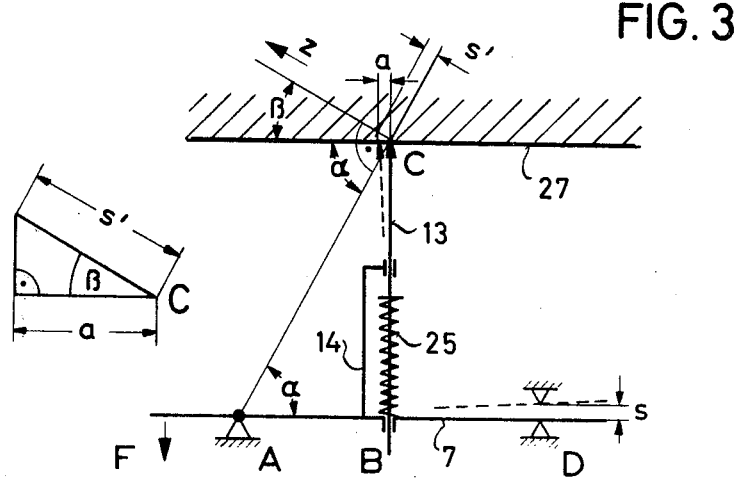
FIG. 3 is a schematic diagram illustrating the geometric relationships of the device.

The formation of the time markings and their order of magnitude is explained more in detail in the following description with the aid of the schematic diagram in FIG. 3.

If, due to the excitation of the electromagnet 15, a force F as indicated by the arrow is applied, it acts on the slide 4 and the bearing play between the slide and the guide rods at the bearings due to the action of the spring 25 remains unchanged at the point A and the tolerances exist at this point without effect, that is, the "point A" introduced for the following discussion instead of the points "5" and "6", has the function of a stationary center of rotation about which the slide is pivoted or tilted as a result of the force F. The possible distance s about which the slide can be pivotally displaced is determined by the tolerances effective at the "point D" which is used to replace the bearing "8". When the slide is pivoted, the recording tip is also displaced from its usual operating position. If the tip were not biased against the speed graph 27 so that it moves in a plane parallel to the guide rods 2, 3, the tip would move, in a sufficient approximation, on a perpendicular line to the straight line extending between the points A and C in the direction Z by the distance s'.

Figure 4:
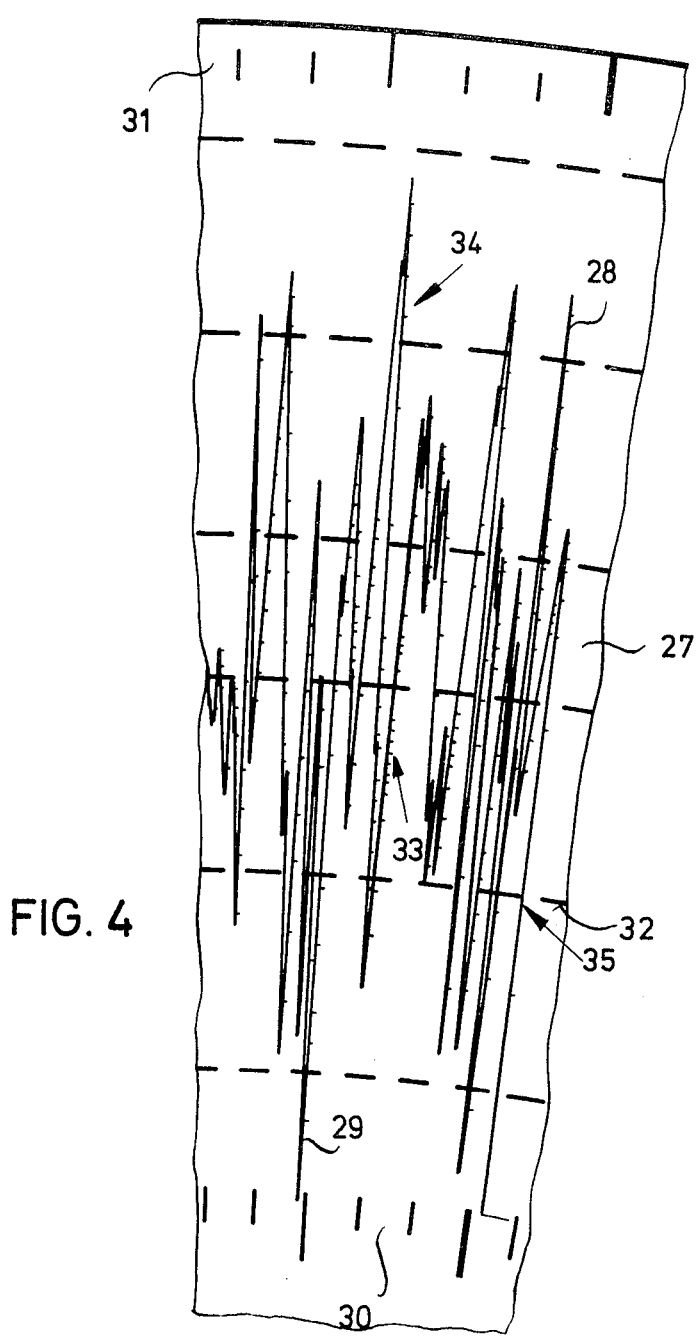
FIG. 4 is a partial detail view of a speed graph magnified by ten power.

The distance s' is determined, with a certain approximation, from the lever ratio $s'/\overline{AC} = s'/\overline{AD}$. The actual deflection of the recording tip 23, that is, the length of the mark on the speed graph 27, results from $a = s' \cdot \cos.\beta$, wherein $\beta$ can be computed from $90° - \alpha$ and $\alpha$ can be determined from $\tan \alpha = \overline{BC}/\overline{AB}$. The dimensions of the selected embodiment ($\overline{AB} = 12$ mm, $\overline{AD} = 26$ mm and $\overline{BC} = 23$ mm) result in $\overline{AC} = 29.4$ mm and $\beta \approx 30°$. In addition, as a result of the selected combination of fit (+0.021/+0.007 mm and 0/−0.006 mm), the values for s, dependent on the tolerances, lie between 0.27 mm maximum and 0.007 mm minimum with the determining bearing being located at the point D. In accordance with the above-mentioned formulae, the limits of the deflection a result in a range of 0.026 mm maximum to 0.007 mm minimum, and for clarity's sake, this computation should not have to be described in detail. The average value within this range is about 0.017 mm and it is fully sufficient for providing a clear marking which can be recognized by an evaluation microscope having a magnification, for example, of 20 power, while these deflections of the recording member are hardly noticeable when the speed graph is viewed with the naked eye. In FIG. 4 the speed graph is illustrated with a magnification of 10 power. The markings, which are time-dependent in the described case and one of which is indicated by reference numeral 28, appear on the side of the speed track 29 opposite the feed direction of the speed graph onto which, in a known manner, clock scales 30, 31 and speed orientation lines 32 are printed. The markings appear in a relatively dense sequence during moderate positive as well as negative accelerations, for example, in the graph section 30, or with relatively wide spacings in the border situations, for example, during braking phases 34, 35.

Of course, for the generation of time markings, it is also conceivable to deflect the slide essentially parallel to the recording plane, wherein, in such a case, the play of the bearings 5, 6 on the guide rod 2 represent the measure of the magnitude of the time markings.

While specific embodiments of the invention have been shown and described in detail to illustrate the application of the inventive principles, it will be understood that the invention may be embodied otherwise without departing from such principles.

What is claimed is:

1. Recording device for a tachograph for recording time markings superimposed on a speed graph by momentary deflection of a recording member in the direction of the time coordinate, for recording on the speed graph the recording member is actuated transversely of the feed direction of the recording medium driven in synchronization with actually elapsed time, wherein said recording device comprises a pair of stationary guide rods, a slide movably supported on said guide rods and arranged to be positioned parallel to the recording support surface of a tachograph, a recording member supported on said slide and arranged to be disposed substantially perpendicularly to the recording support surface, means for biasing said recording member against a recording support surface, an electromagnet arranged to be excited by a pulse generator capable of delivering time-constant pulses, said electromagnet positioned relative to said slide for deflecting said slide in the direction of the time coordinate of the recording support surface, and said slide being mounted on said guide rods so that said slide displaces said recording member laterally relative to said recording support surface due to said means biasing said recording member against the recording support surface.

2. Recording device, as set forth in claim 1, wherein said slide includes a ferromagnetic element attracted by said electromagnet when said electromagnet is excited for pivoting said slide with respect to one of said guide rods with a bearing play provided in the bearing of said slide on said other guide rod.

3. Recording device, as set forth in claim 1, wherein said slide is formed of a ferromagnetic material.

4. Recording device, as set forth in claim 1, wherein said guide rods being disposed in parallel relation, said slide being mounted on said guide rods for movement in the axial direction of said rods, means on said slide forming a closely fitted bearing for one of said rods and an elongated slotted bearing for the other of said rods so that said slot permits play between said slide and said guide rod and said electromagnet being located on the side of said guide rod with which said slide is in closely fitting engagement and on the opposite side from said slide is in contact via said slot.

* * * * *